(12) United States Patent
Jayaraman (10) Patent No.: US 7,564,928 B2
(45) Date of Patent: Jul. 21, 2009

(54) SYSTEM AND METHOD OF FREQUENCY SYNTHESIS TO AVOID GAPS AND VCO PULLING IN DIRECT BROADCAST STATELITE SYSTEMS

(75) Inventor: Arun Jayaraman, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 371 days.

(21) Appl. No.: 11/174,359

(22) Filed: Jun. 30, 2005

(65) Prior Publication Data
US 2005/0245218 A1    Nov. 3, 2005

Related U.S. Application Data

(63) Continuation of application No. 09/588,992, filed on Jun. 6, 2000, now Pat. No. 6,968,020.

(51) Int. Cl.
*H03D 3/18* (2006.01)
*H03D 3/24* (2006.01)

(52) U.S. Cl. .................... 375/327; 375/376

(58) Field of Classification Search ............... 375/327, 375/130, 376, 294, 374; 327/156, 157, 147; 455/180.3; 329/325, 360
See application file for complete search history.

(56) References Cited

U.S. PATENT DOCUMENTS

| 5,572,168 | A | | 11/1996 | Kasturia |
| 5,789,987 | A | | 8/1998 | Mittel et al. |
| 6,127,884 | A | * | 10/2000 | Rishi ........................ 329/304 |
| 6,134,282 | A | * | 10/2000 | Ben-Efraim et al. ........ 375/350 |
| 6,282,413 | B1 | * | 8/2001 | Baltus ........................ 455/260 |
| 6,567,479 | B1 | * | 5/2003 | Alderton .................... 375/326 |
| 2003/0050029 | A1 | | 3/2003 | Kaufmann et al. |

\* cited by examiner

*Primary Examiner*—Khai Tran
(74) *Attorney, Agent, or Firm*—Jackson Walker L.L.P.; Christopher J. Rourk (57) ABSTRACT

A system and method for designing a broadband tuner such that VCO pulling is minimized and gaps in frequency coverage are avoided, while total power consumption is reduced, is disclosed. A broadband spectrum is divided into sub-bands and various multipliers to a local oscillator output are introduced. In this fashion, the present invention allows a local oscillator within the broadband tuner to always generate signals that lie outside of the broadband spectrum for a particular broadband application. Additionally, a modulus ratio for a dual modulus prescaler with the local oscillator is maximized, thereby reducing power consumption.

21 Claims, 5 Drawing Sheets

SYSTEM AND METHOD OF FREQUENCY SYNTHESIS TO AVOID GAPS AND VCO PULLING IN DIRECT BROADCAST STATELITE SYSTEMS

RELATED APPLICATIONS

This application is a continuation of application Ser. No. 09/588,992, filed Jun. 6, 2000 now U.S. Pat. No. 6,968,020, which is hereby incorporated herein by reference. The following application of common assignee contains some common disclosure as the present application and is incorporated herein by reference in its entirety:

U.S. patent application entitled "FULLY INTEGRATED BROADBAND TUNER", filed Feb. 4, 2000, application Ser. No. 09/497,717, now U.S. Pat. No. 6,731,712.

BACKGROUND OF THE INVENTION

1. Field of the Invention

The present invention relates generally to broadcast receivers, and more particularly to broadband tuners utilizing a local oscillator.

2. Related Art

Broadcast satellites transmit signals over multiple channels across a broadband spectrum. These satellites use standardized broadcast formats, such as Digital Satellite Service (DSS), used in North America, and Direct Video Broadcast (DVB), used in Europe. Both DSS and DVB broadcast over a broadband spectrum ranging from 12 to 14 GHz. When combined with receiving systems, these broadcast satellites create a direct broadcast satellite system (DBS).

A DSS/DVB receiving system generally includes an antenna, a low-noise block down-converter (LNB) and a down-conversion broadband receiver. Although there are many ways in which to implement the down-conversion broadband receiver, a direct down-conversion broadband receiver implementation is the most common in current generation tuners. The direct down-conversion broadband receiver comprises a direct down-conversion tuner and a baseband demodulator.

The LNB converts the 12-14 GHz band signal received by the antenna into a 950-2150 MHz band signal. This broadband signal is specified by the DSS/DVB standards. The direct down-conversion tuner directly converts one channel in this 950-2150 MHz band down to baseband, which consists of in-phase (I) and quadrature (Q) components. These I and Q components are then converted into digital data and demodulated by the baseband demodulator.

The direct down-conversion tuner in the direct down-conversion broadband receiver typically utilizes mixers to perform the down-conversion from 950-2150 MHz to I and Q components. These mixers require a local oscillator (LO), which typically comprises a frequency synthesizer with a step size equal to a receive-channel spacing. Such local oscillators are commonly implemented using a reference frequency generator, at least one voltage controlled oscillator (VCO), and a phase-locked loop (PLL) comprising a phase/frequency detector (PFD), a charge pump, a loop filter, and a divider. The reference frequency generator uses an external crystal.

Although the term "local oscillator" is frequently used to refer to only a VCO portion of a frequency synthesizer within a tuner, as used herein, the local oscillator refers to the frequency synthesizer within the tuner.

The signal from this local oscillator drives the mixers. By definition, the mixers in the direct down-conversion broadband receiver are driven by an input frequency that is equivalent to the carrier frequency of a selected channel. Thus the conversion to baseband is done in one step, thereby making it a direct down-conversion. Typically, the local oscillator operates at this same frequency input to the mixers.

However, some local oscillators are designed to operate at approximately twice the frequency of the carrier signal. The output of the local oscillator is then put through a 2-divider just prior to being fed to the mixers. This is done to avoid the many problems, such as cross modulation and direct current (DC) offset, which arise when the local oscillator operates at exactly the same frequency as the carrier.

In addition, when the signal is to be separated into I and Q components, using this divide by two approach offers another benefit. The 2-divider can be designed to easily generate the phase shift required to obtain the Q component, thereby avoiding the need for poly-phase filters or other complex designs. Thus with a 2-divider approach to the direct down-conversion tuner in a direct-down conversion receiver, both the I and Q components are obtained simultaneously, with a high degree of accuracy.

However, in DBS systems, the 2-divider approach is problematic. A DSS/DVB receiver must be able to receive channels over the entire broadband spectrum defined by the DSS/DVB standards. This broadband receiving spectrum causes the typical 2-divider approach to tuner design to create undesirable coupling between the local oscillator (LO) signal and the incoming radio frequency (RF) signal, within a DBS tuner chip. If the RF signal at twice a desired receive channel frequency is strong, this coupling can cause VCO pulling.

In addition, the RF signal at twice the desired receive channel frequency can mix with the LO signal and cause signal-to-noise-ratio degradation. For example, because the VCO typically generates a waveform, which is not a perfect sine wave, this generated waveform has additional harmonic content. These harmonic overtones can lead to composite triple beat. Thus, when some of the lower frequencies in the broadband spectrum of the DBS system are tuned to, the VCO wave form can interfere with higher RF channels, which in turn can created a product on the channel being tuned to, thereby reducing sensitivity of the tuner chip from the front end.

In addition to this VCO pulling problem with current broadband receivers, typical broadband receivers also consume an undesirable amount of power. With the DSS/DVB standards, the channel can be at any frequency in the specified signal range of 950 to 2150 MHz. A tuner chip designed to directly convert this broadband spectrum down to baseband typically relies on a reference frequency of 1 MHz or 500 KHz. The reference frequency used will commonly be set equal to a receive-channel spacing for the particular application. Generally, the reference frequency will not deviate significantly from these values. The reason for this is twofold. First, as the reference frequency is lowered, the phase noise performance required of the PLL increases, because the multiplication factor to the output becomes higher. Second, as the reference frequency is raised, the tuner chip loses granularity.

Because the tuning spectrum in DBS systems is so wide and any frequency in that range may be a channel, typical DBS tuner chips utilize a 16/17 prescaler in the divider in the PLL in order to handle the 1 MHz reference frequency case. This is done to avoid gaps in tuning range caused by a prescaler with too high of a modulus ratio. However, the use of a lower modulus prescaler in the tuner chip requires operation of counters in the divider at a higher frequency. Thus, this approach to local oscillator design creates a significant and undesirable power drain.

Therefore, what is needed is a system and method for local oscillator design for use in a broadband tuner, which avoids gaps in tuning range and VCO pulling, while also reducing the broadband tuner's power consumption.

SUMMARY OF THE INVENTION

The present invention is directed toward a system and method for designing a broadband tuner.

The present invention provides a method for dividing a broadband spectrum into sub-bands, thereby enabling the design of a broadband tuner with reduced VCO pulling. By splitting up a broadband spectrum and introducing various multipliers, the present invention allows a local oscillator within a broadband tuner to always generate signals that lie outside of the broadband spectrum for a particular broadband application. In this fashion, VCO pulling within the broadband tuner is reduced.

In addition, according to one aspect of the invention, the broadband tuner has reduced power consumption. Because the broadband spectrum is broken up into sub-bands and multipliers are introduced, additional power savings within the broadband tuner are possible. The present invention provides a system and method for maximizing a modulus ratio for a dual modulus prescaler within the local oscillator, without introducing gaps in frequency coverage. In this fashion, the present invention reduces the number of high frequency components within the broadband tuner, thereby reducing power consumption.

Further features and advantages of the invention as well as the structure and operation of various embodiments of the invention are described in detail below with reference to the accompanying drawings.

DETAILED DESCRIPTION OF THE INVENTION

The present invention is directed toward a system and method for designing a broadband tuner. The present invention is disclosed and described herein in terms of an example DBS embodiment. However, after reading this description it will become apparent to one skilled in the art how to implement the invention in alternative embodiments and alternative applications. As such, the description of this example embodiment should not be construed to limit the scope or breadth of the present invention.

Figure 1:
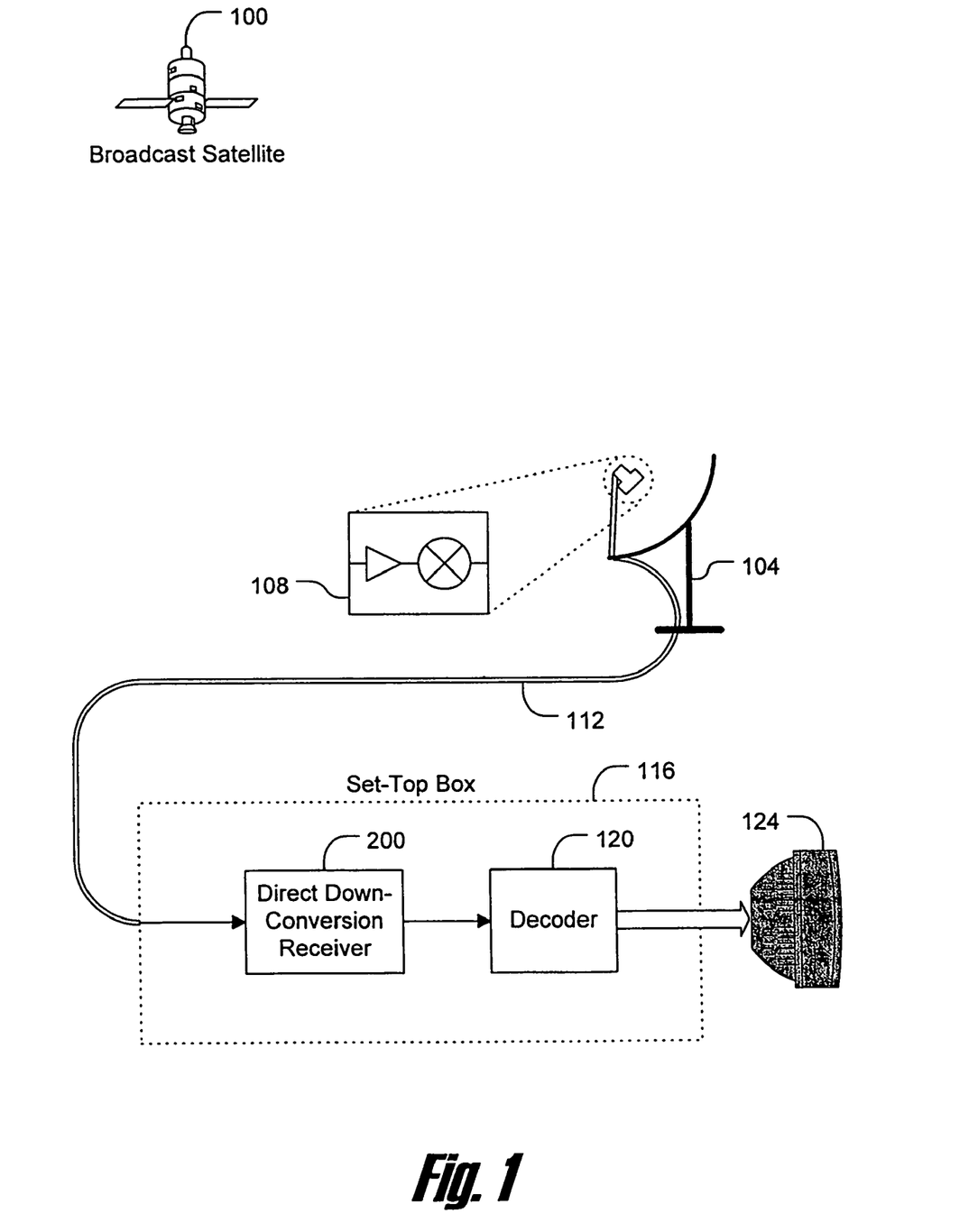
FIG. 1 is a block diagram depicting an example operational environment according to one embodiment of the present invention.

FIG. 1 is a block diagram depicting an example operational environment according to one embodiment of the present invention. Referring now to FIG. 1, a broadcast satellite 100 transmits a signal comprising multiple channels over a broadband spectrum covering 12 to 14 GHz. The signal is received by an antenna 104. The signal is then passed through a low-noise block converter (LNB) 108, which takes the 12-14 GHz band signal received by the antenna 104 and converts it to a 950-2150 MHz band signal.

The signal then passes through a coax cable 112 into a set-top box 116, which allows a user to select a channel to view. Set-top box 116 contains other features and functions well understood by those skilled in the art and not essential to the disclosure of the present invention. Set-top box 116 also contains a direct down-conversion receiver 200. In one embodiment, the direct down-conversion receiver 200 generates data that is sent to a decoder 120. The decoder 120 is an MPEG decoder in one embodiment, and its output is sent to a television 124, or other DBS display device, for viewing by a user.

Figure 2:
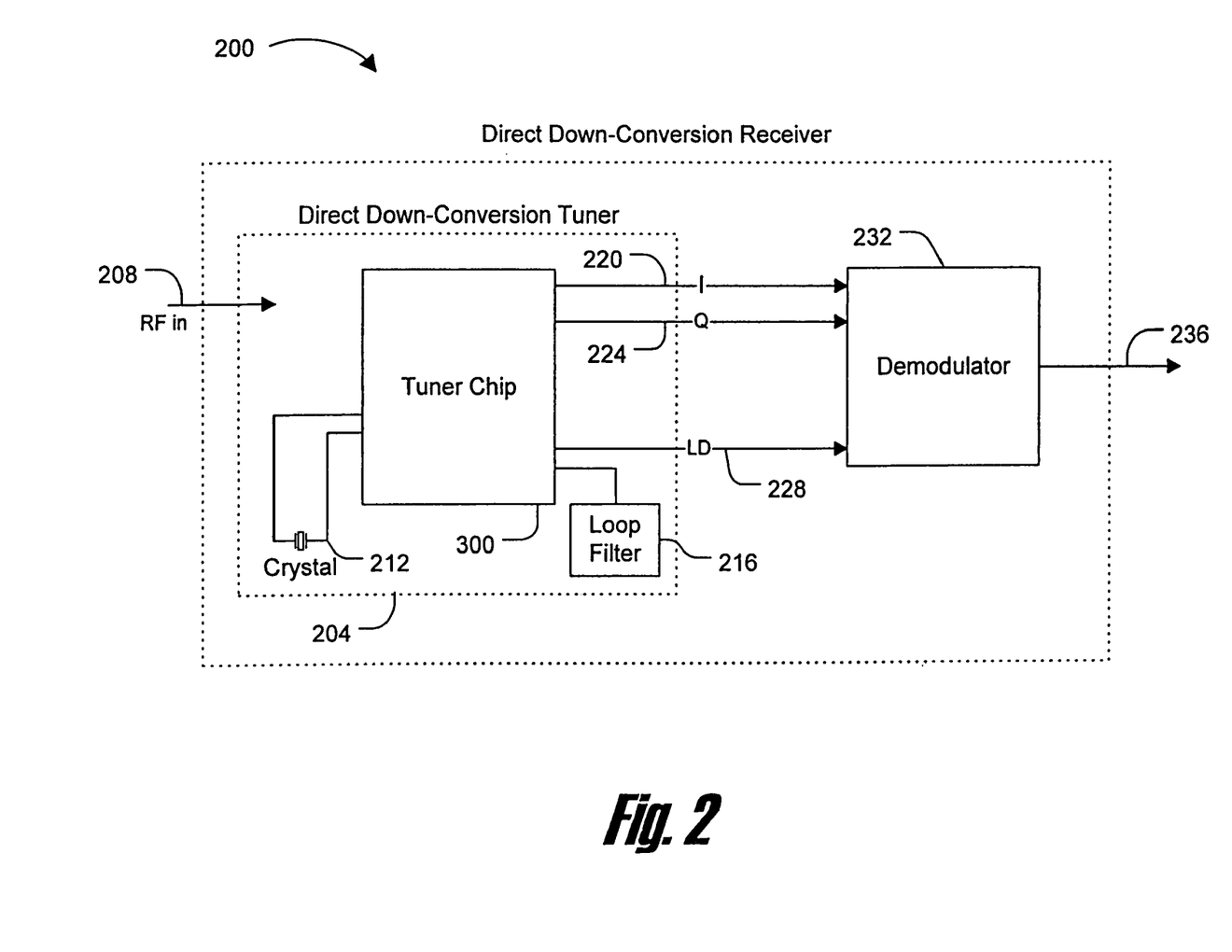
FIG. 2 is a block diagram depicting additional detail regarding one aspect of an example operational environment according to one embodiment of the present invention.

FIG. 2 is a block diagram depicting additional detail regarding one aspect of an example operational environment according to one embodiment of the present invention. Referring now to FIG. 2, the direct down-conversion receiver 200 is the same as that shown in FIG. 1. It has an input 208, which is the incoming signal from the LNB 108. It also has an output 236, which is the data sent to the decoder 120.

The direct down-conversion receiver 200 includes a direct down-conversion tuner 204 and a demodulator 232. The direct down-conversion tuner 204 outputs I and Q components 220 and 224. These I and Q components 220 and 224 are at baseband. The demodulator 232 takes these I and Q components 220 and 224, and converts them to digital output in a manner well known by those skilled in the art.

In one embodiment of the present invention, the direct down-conversion tuner 204 comprises a tuner chip 300, a crystal 212 and a loop filter 216. The crystal 212 provides the tuner chip 300 with a crystal reference frequency in a manner well known in the relevant art(s). In one embodiment, crystal 212 is a 10.11 MHz crystal. Also in one embodiment, the tuner chip 300 has a lock detect output 228 that is fed to the demodulator 232. In an alternative embodiment, lock detect output 228 is not an output, but is used instead entirely within tuner chip 300.

In one embodiment, loop filter 216 is a low-pass filter provided for use with a phase-locked loop inside tuner chip 300 in a manner well known in the relevant art(s). In addition, alternative embodiments include those having loop filter 216 contained within tuner chip 300.

While the present invention is disclosed in terms of a direct down-conversion receiver used as part of a DBS intermediate frequency (IF) receiver system, those skilled in the relevant art(s) will understand that the present invention is applicable to any broadband application in which twice a lowest potential channel is a frequency within the broadband spectrum.

Figure 3:
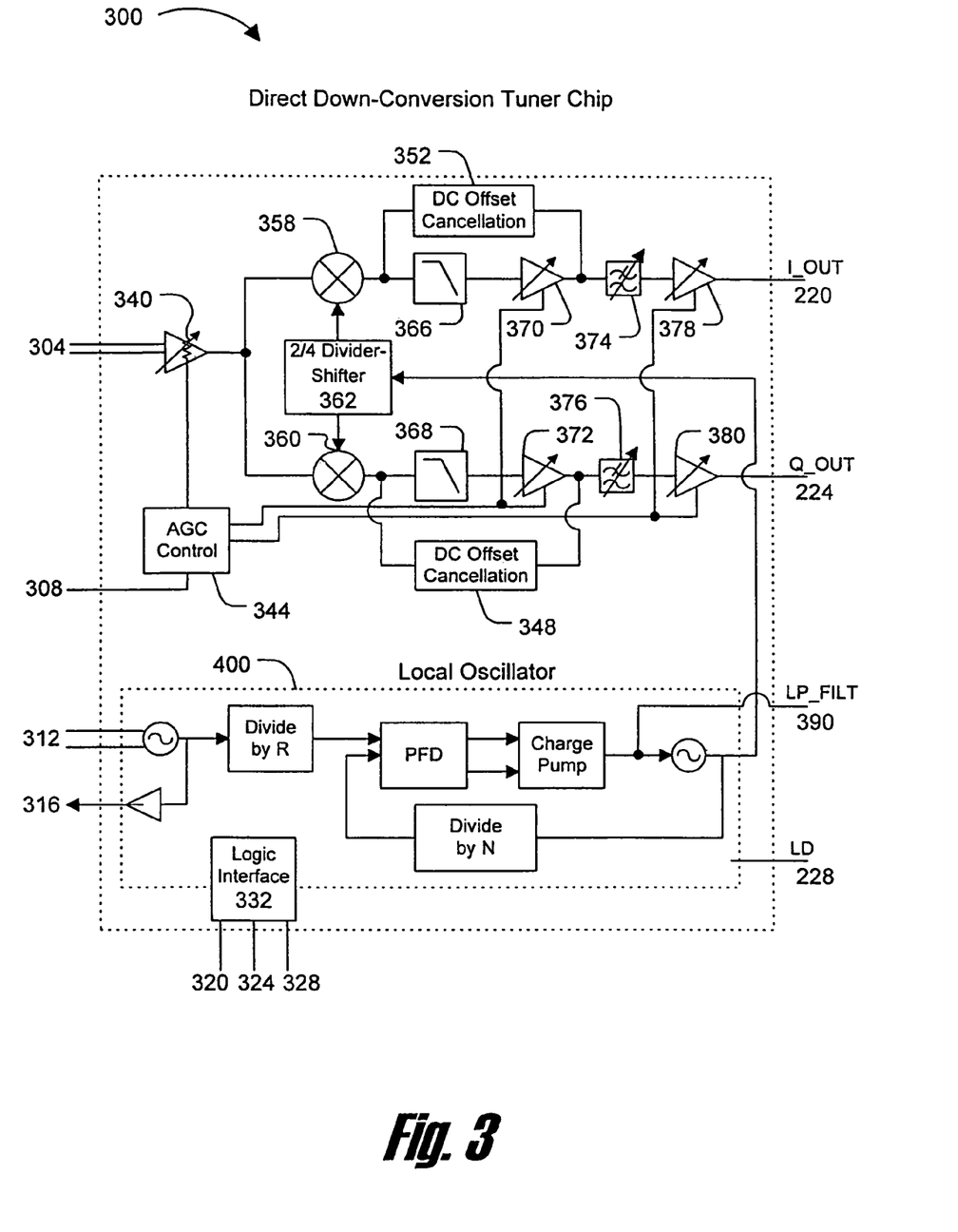
FIG. 3 is a block diagram depicting components of a direct down-conversion tuner chip according to one embodiment of the present invention.

FIG. 3 is a block diagram depicting components of a direct down-conversion tuner chip according to one embodiment of the present invention. Referring now to FIG. 3, the direct down-conversion tuner chip 300 comprises multiple inputs, outputs and components. RF input 304 is the RF signal from the LNB 108. In one embodiment, RF input 304 is provided on two balanced pins. Automatic gain control (AGC) input 308 is a DC voltage that, in one embodiment, controls the gain of RF attenuator 340 and AGC amplifiers 370, 372, 378 and 380. Crystal reference frequency input 312 is the input from the crystal 212.

Check reference output 316 provides the reference clock for the demodulator 232 in a manner well known in the relevant art(s). I output 220 is the in-phase component of a selected channel. Q output 224 is the quadrature component of the selected channel. In one embodiment, loop filter output 390 connects to loop filter 216, thus providing a loop filter component of the PLL within a local oscillator 400. Finally, in one embodiment lock detect output 228 is provided for use with the demodulator 232 as discussed previously.

Logic interface 332 is coupled to the local oscillator 400 and to a 2/4 divider-shifter 362. This coupling enables logic interface 332 to control the behavior of both the local oscillator 400 and the 2/4 divider-shifter 362 in a manner described herein. Logic interface 332 includes digital storage registers as needed. Those skilled in the relevant art(s) will understand when and how many such digital storage registers are needed given the disclosure herein and the particular application. In one embodiment, logic interface 332 is controlled via a three-line bus. This three-line bus comprises a serial bus clock signal 320, a serial bus latch enable 324 and a serial bus data line 328.

AGC Control 344 splits the incoming AGC input 308 such that it is provided to multiple components within the direct down-conversion tuner chip 300. One such component is RF attenuator 340, which is a voltage controlled attenuator. In one embodiment, RF input 304 is provided to RF attenuator 340, which decreases the amplitude variations in the receive signal. This is done to optimize the spurious free dynamic range of the receiver for various input signal levels.

Local oscillator 400 feeds the mixers 358 and 360 via the 2/4 divider-shifter 362. In one embodiment, the output of the local oscillator 400 is selected to be exactly twice or four times the desired receive frequency. This is done to minimize the RF to LO coupling, as described in greater detail below. The output from the local oscillator 400 is then divided by an appropriate number in the 2/4 divider-shifter 362 before being fed to the mixers 358 and 360. Additionally, the 2/4 divider-shifter 362 shifts the phase of the signal provided to the mixer 360 by ninety degrees. This is done to obtain the quadrature component of the received signal.

The output of the mixers 358 and 360 is the difference in frequency between RF signal 304 and the oscillator signals from the 2/4 divider-shifter 362. Thus, when RF signal 304 and the oscillator signals from the 2/4 divider-shifter 362 have the same frequency, the RF is removed, thereby converting the signal to baseband. In one embodiment, the outputs of mixers 358 and 360 are then passed through two separate fixed low-pass filters 366 and 368, and two separate AGC amplifiers 370 and 372. The fixed low-pass filters 366 and 368 aid in tuning out any part of the RF signal not within the selected channel. The AGC amplifiers 370 and 372 maintain the signal of the selected channel at a constant amplitude, regardless of variations in the receive signal level. This is done to keep the signal amplitude within the narrow range required by the demodulator 232.

Also in one embodiment, DC offset cancellation components 348 and 352 bridge the fixed low-pass filters 366 and 368, and the AGC amplifiers 370 and 372 to cancel any DC offset for the I and Q channels. This is done because LO leaks to RF, mixed down to DC. If the DC offset is not cancelled, it will clip the amplifier chain. In one embodiment, DC offset cancellation components 348 and 352 are connected to two off-chip capacitors. However, alternative embodiments include other methods and apparatus for canceling DC offset, such as off-chip alternating current (AC) coupling via a series capacitor.

In one embodiment, variable low-pass filters 374 and 376 aid in tuning out any part of the RF signal not within the selected channel, thus ensuring consistent baseband output. In alternative embodiments, these variable low-pass filters 374 and 376 are fixed low-pass filters or other components able to help ensure a proper baseband output, such as off-chip L-C filters. AGC amplifiers 378 and 380 maintain the signal of the selected channel at a constant amplitude, regardless of variations in the receive signal level. This is done to keep the signal amplitude within the narrow range required by the demodulator 232 to maximize signal-to-noise-ratio.

As mentioned previously, the present invention is described herein in terms of this example DBS embodiment. However, it should be remembered that description in these terms is provided for ease of discussion only. After reading the description herein, it will become apparent to one skilled in the relevant art(s) that the present invention can be implemented in any of a number of alternative embodiments and alternative broadband applications. For example, although the disclosure provided herein shows the demodulator as separate from the tuner, the present invention may be implemented on a single integrated circuit with both the tuner and the demodulator on the same chip. As such, the description of the present invention in terms of this example embodiment should not be construed to limit the scope or breadth of the present invention.

Figure 4:
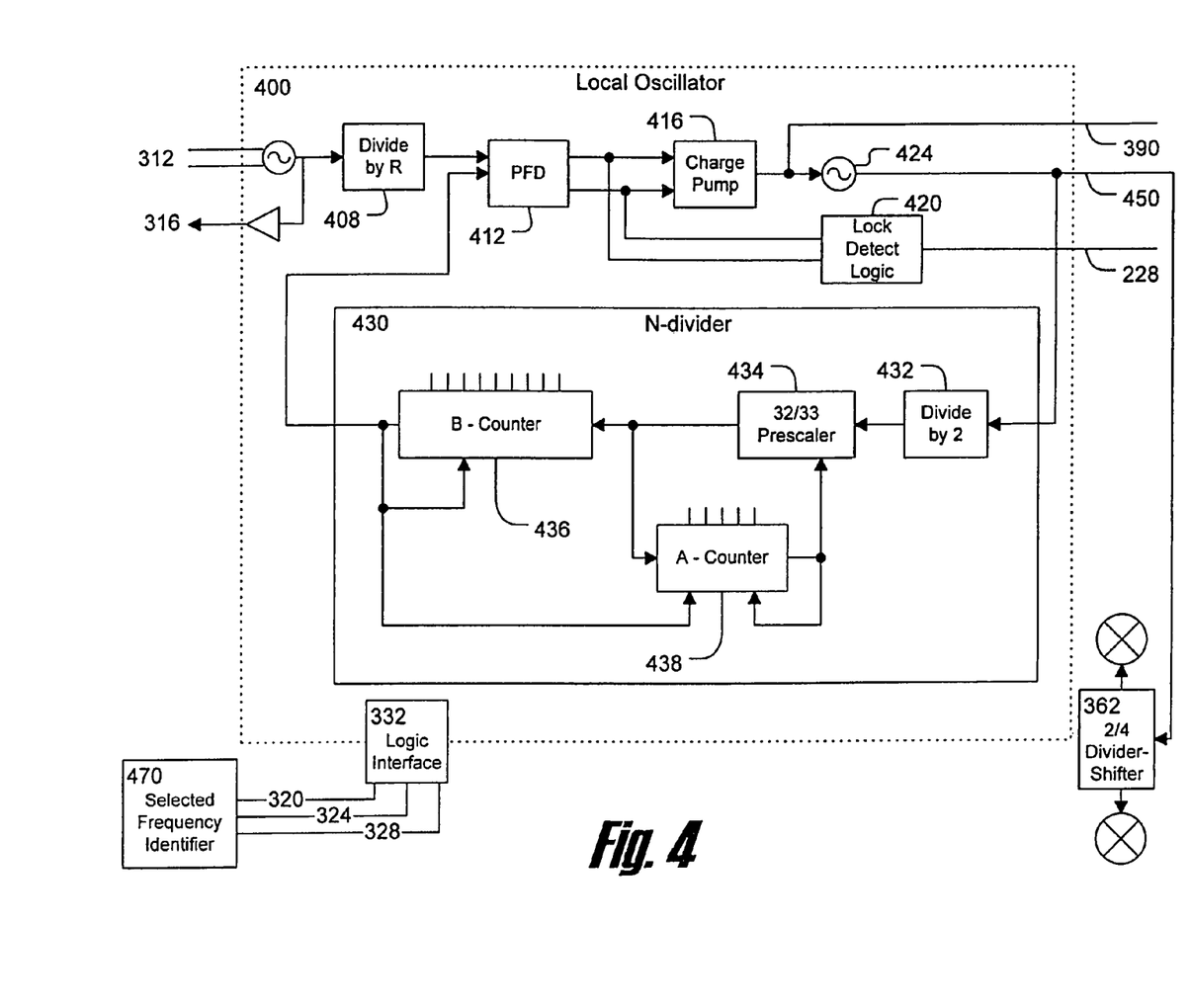
FIG. 4 is a block diagram depicting components of a local oscillator with an N-divider and related elements of a broadband receiver system according to one embodiment of the present invention.

FIG. 4 is a block diagram depicting components of a local oscillator with an N-divider and related elements of a broadband receiver system according to one embodiment of the present invention. Referring now to FIG. 4, the local oscillator 400 from FIG. 3 is now presented in greater detail. Crystal reference frequency input 312, clock reference output 316, loop filter output 390, and the lock detect output 228 are the same as described above. Likewise, the three-line bus for logic interface 332 is also the same, comprising the serial bus clock signal 320, the serial bus latch enable 324 and the serial bus data line 328. A local oscillator output 450 is the signal provided to the 2/4 divider-shifter 362, and thereby the mixers 358 and 360 on FIG. 3.

In one embodiment, logic interface 332 is coupled to a divide by R block 408, an N-divider 430, a programmable charge pump 416, and at least one voltage controlled oscillator (VCO) 424. In one embodiment, divide by R block 408 is included in LO 400 to allow the direct down-conversion tuner chip 300 the ability to be used in multiple broadband receiver applications. R is determined by the demodulator's ability to correct any frequency offsets. In one embodiment, in which crystal reference frequency input 312 is at 10.11 MHz, divide by R block 408 is programmed by logic interface 332 with two bits, and R will be either 10 or 20, depending on a reference frequency required by a particular broadband receiver application. The reference frequency is 1 MHz or 500 kHz respectively.

Phase/frequency detector (PFD) 412 and charge pump 416 are standard components of a phase-locked loop and function in a manner well known in the relevant art. The lock detect output 228 is created by lock detect logic 420. This lock detect logic 420 is a standard component of phase-locked loops and may be implemented in different ways in alternative embodiments. For example, in one embodiment a simple nor-gate can be placed across outputs of the PFD 412.

In one embodiment, loop filter output 390 attaches between charge pump 416 and the at least one VCO 424. Loop filter output 390 connects to loop filter 216, thus converting the current output from charge pump 416 into a voltage output for driving one of the at least one VCO 424 at a time. In alternative embodiments, different PLL architectures are used. For example, the present invention may be implemented with a fractional-N PLL or a multi loop PLL, instead of the PLL architecture disclosed herein.

N-divider 430 takes a local oscillator output 450 and divides it by an appropriate number N to provide a compare frequency input to the PFD 412. The appropriate number N is determined by a desired frequency derived from the selected channel. By dividing the local oscillator output by N, the PLL locks the local oscillator output 450 to the desired frequency, which is equal to N times the reference frequency. In one embodiment, the local oscillator output 450 is a sine wave. In an alternative embodiment, the local oscillator output 450 is a square wave.

In one embodiment, N-divider 430 comprises a fixed divide-by-2 block 432, a 32/33 prescaler 434, a 9-bit B-counter 436, and a 5-bit A-counter 438. N-divider 430 is programmed via logic interface 332 by loading registers in the 9-bit B-counter 436 and the 5-bit A-counter 438, thereby causing the at least one VCO 424 to lock onto the desired frequency. N is an integer, which is determined by a B-number and an A-number calculated using the following equations:

$$B\text{-number}=\lfloor(\text{the desired frequency}\div 32\div 2)\rfloor \quad (1)$$

$$A\text{-number}=\lfloor(\text{the desired frequency}\div 2)-(32\cdot B\text{-number})\rfloor \quad (2)$$

Once the B-number and the A-number are loaded into the 9-bit B-counter 436 and the 5-bit A-counter 438 respectively, the N-divider 430 operates by dynamically changing a modulus control bit for the 32/33 prescaler 434. For A-number of clock cycles, the N-divider 430 divides the local oscillator output 450 by 33, and for (B-number−A-number) of clock cycles, the N-divider 430 divides the local oscillator output 450 by 32.

In one embodiment, the desired frequency is either two or four times the selected channel's frequency. A selected frequency identifier 470 determines the desired frequency based upon the selected channel and two frequency sub-bands that make up the broadband spectrum. If the selected channel falls in a first-band of the two frequency sub-bands, the desired frequency is set to four times the selected channel's frequency, and the 2/4 divider-shifter 362 divides the local oscillator output 450 by four before inputting it to the mixers. If the selected channel falls in a second-band of the two frequency sub-bands, the desired frequency is set to two times the selected channel's frequency, and the 2/4 divider-shifter 362 divides the local oscillator output 450 by two before inputting it to the mixers.

In one embodiment, the first-band covers the frequency range 950-1075 MHz, and the second-band covers the frequency range 1076-2150 MHz. The selected frequency identifier 470 determines the desired frequency, calculates the B-number and the A-number using equations (1) and (2) above, loads the B-number into the 9-bit B-counter 436 via the logic interface 332, loads the A-number into the 5-bit A-counter 438 via the logic interface 332, and sets a divider-state for the 2/4 divider-shifter 362 via the logic interface 332.

In alternative embodiments, there are more than two sub-bands. In addition, alternative embodiments include additional frequency ranges for the sub-bands, provided that the desired frequency never lies in the broadband spectrum. Those skilled in the relevant art(s) will understand how to implement these alternative embodiments given the disclosure herein.

The selected frequency identifier 470 may be implemented using hardware, software or a combination thereof and may be implemented in a computer system or other processing system. In one embodiment, the selected frequency identifier 470 is implemented in a software driver running on a general purpose computer. However, alternative embodiments include multiple software environments and/or multiple hardware designs, all of which perform the functionality described herein.

Figure 5:
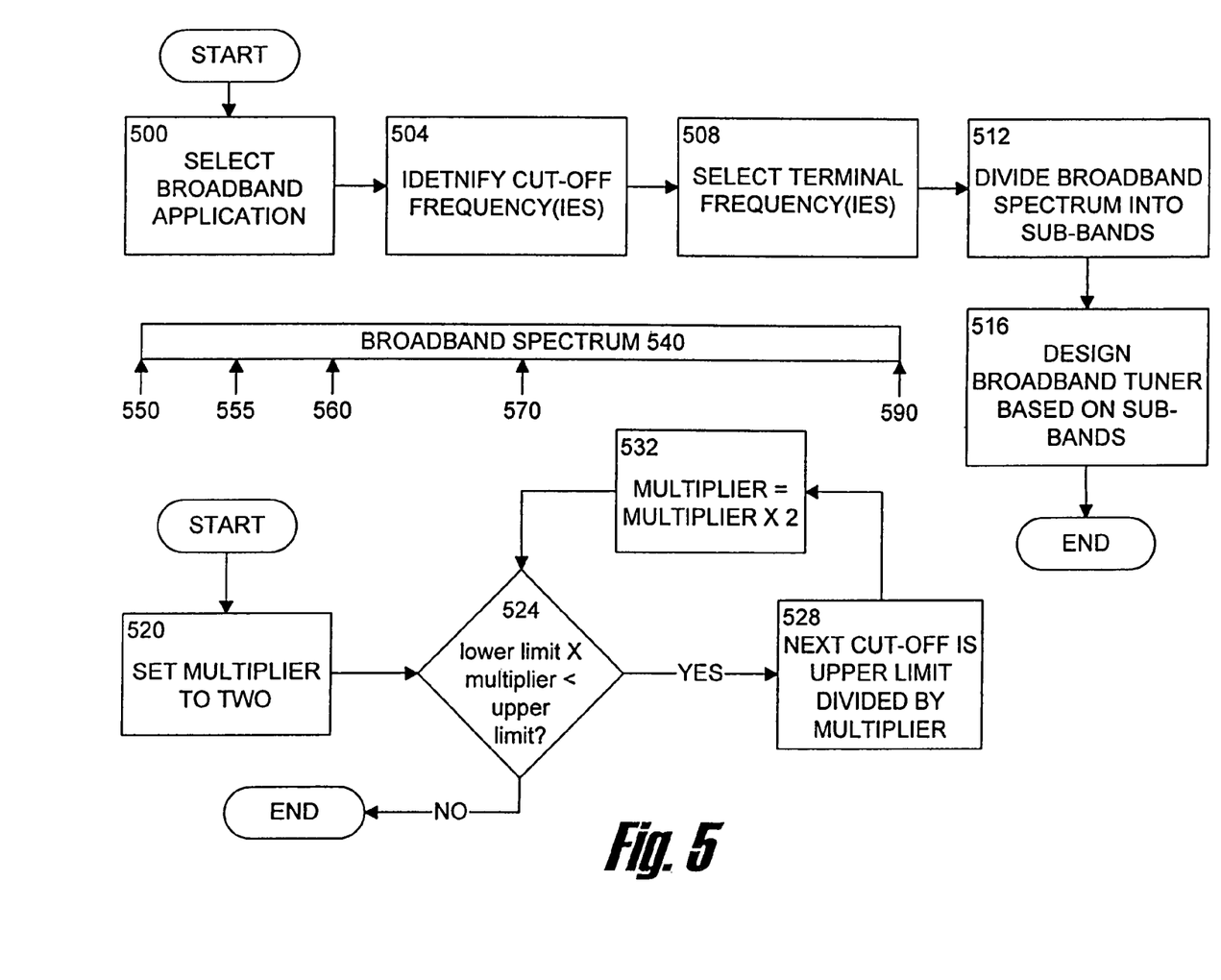
FIG. 5 is a two-part flow chart, and a block diagram of an exemplary broadband spectrum, depicting a method for providing a broadband tuner utilizing sub-bands according to one embodiment of the present invention.

FIG. 5 is a two-part flow chart, and a block diagram of an exemplary broadband spectrum, depicting a method for providing a broadband tuner utilizing sub-bands according to one embodiment of the present invention. Referring now to FIG. 5, the process begins with step 500, in which a particular broadband application is selected for the broadband tuner. The particular broadband application defines a broadband spectrum 540 having an upper limit 590 and a lower limit 550 for the frequencies that can contain receivable channels. In one embodiment, the particular broadband application is the DBS system, and the upper limit 590 and the lower limit 550 are 2150 MHz and 950 MHz respectively. However, the present invention is applicable to all broadband applications in which twice the lower limit 550 is less than the upper limit 590.

Following step 500, one or more cut-off frequencies are identified in step 504. The cut-off frequencies are identified in step 504 based on the upper limit 590 and the lower limit 550. Steps 520 through 532 depict an exemplary process for identifying the cut-off frequencies. These steps are discussed further below.

In step 508, one or more terminal frequencies are selected based upon the cut-off frequencies. In one embodiment, the terminal frequencies are equal to a channel frequency just above each of the cut-off frequencies. Thus, in one DBS embodiment, the cut-off frequency is 1075 MHz, and the terminal frequency is 1076 MHz, when the channel frequencies are at 1 MHz intervals. However, alternative embodiments include those in which the terminal frequencies are any frequency greater than each of the cut-off frequencies and less than either the upper limit 590 or a previous terminal frequency.

Following step 508, the broadband spectrum 540 is divided into sub-bands in step 512 using the terminal frequencies selected in step 508. A first-band extends from the lower limit 550 to a channel frequency just below a first-terminal from the terminal frequencies. A last-band extends from a last-terminal from the terminal frequencies to the upper limit 590. Any intermediate bands extend from each respective terminal from the terminal frequencies to a channel frequency just below a next-terminal from the terminal frequencies.

Step 516 is the step of designing a new broadband tuner using the sub-bands created in step 512. The new broadband tuner is designed in step 516 in the same fashion as the broadband tuner disclosed herein. The new broadband tuner includes a variable state divider that divides by different numbers for the sub-bands. The different numbers are defined by various multipliers used to identify the cut-off frequencies in step 504. In addition, the new broadband tuner includes a P/P+1 prescaler in which P is maximized without introducing gaps in frequency coverage given a range of potential desired frequencies defined by the channel frequencies, the sub-bands and the various multipliers.

This maximization of P is done using standard mathematical formulas for calculating the available frequencies given a particular prescaler, a particular A-counter and a particular B-counter. A standard N-divider, such as disclosed herein, is limited by two key factors: (1) the particular A-counter must have a number of input bits equal to $\log_2(P)$; (2) a B-number loaded onto the particular B-counter must be greater than any A-number loaded onto the particular A-counter, or the standard N-divider circuit will fail.

Thus, for example, a standard N-divider with a 32/33 prescaler cannot generate a 991 MHz input to the mixers in a traditional divide-by-two scheme using a 1 MHz reference frequency. Using equations (1) and (2) above, if a desired frequency is 1982 MHz (twice a selected channel frequency):

$B\text{-number}=\lfloor(\text{the desired frequency}\div P\div 2)\rfloor=\lfloor(1982\div 64)\rfloor=30$ $A\text{-number}=\lfloor(\text{the desired frequency}\div 2)-(P\cdot B\text{-number})\rfloor=\lfloor(991-32\cdot 30)\rfloor=31$ These are invalid values for B-number and A-number. Thus in the present invention, a 32/33 prescaler cannot be used if 991 MHz is in the range of potential desired frequencies defined by the channel frequencies, the sub-bands and the various multipliers.

By maximizing P using the standard mathematical formulas, given the range of potential desired frequencies to be generated, the present invention reduces power consumption for the new broadband tuner. During this maximizing process, which is part of step 516, steps 508 through 512 can be repeated to arrive at alternative terminal frequencies and sub-bands, thereby enabling additional power consumption benefits. A person of skill in the relevant art(s) will understand how to implement this maximization process given the disclosure herein.

Steps 520 through 532 depict an exemplary process for identifying the cut-off frequencies. The process begins with step 520 in which a multiplier is set to two. In step 524, the lower limit 550 from the broadband spectrum 540 is multiplied by the multiplier and compared with the upper limit 590. If the lower limit 550 times the multiplier is less than the upper limit 590, the process proceeds to step 528. Otherwise, the process ends.

In step 528, a next cut-off is set to the upper limit 590 divided by the multiplier. On a first pass through step 528, the next cut-off is a first-cut-off 570. On a second pass, the next cut-off is a second-cut-off 560. On a third pass, it is a third-cut-off 555, etc. Following step 528, the multiplier is increased by a factor of two in step 532, before the process returns to step 524.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for tuning at least one incoming signal, said system comprising:
   a local oscillator generating a local oscillator signal;
   a divider-shifter coupled to said local oscillator and receiving said local oscillator signal to generate at least one fractional signal;
   at least one downconverter coupled to said divider-shifter and receiving said at least one fractional signal;
   an incoming signal comprising a first incoming signal frequency band and a second incoming signal frequency band coupled to said at least one downconverter;
   wherein said divider-shifter divides the local oscillator signal by a first number when said first incoming signal frequency band is selected and divides the local oscillator signal by a second number when said second incoming signal frequency band is selected, wherein the first number is essentially half the second number; and
   wherein said at least one fractional signal is used to tune said selected incoming signal frequency band, thereby reducing interference between said at least one downconverter and said local oscillator.

2. The system of claim 1 further comprising a N-divider that divides said local oscillator signal by a value N before comparison with a reference frequency, thereby controlling a frequency of said local oscillator signal.

3. The system of claim 1 further comprising a frequency identifier for determining the incoming signal frequency band.

4. The system of claim 1 further comprising a broadband receiver.

5. The system of claim 1 further comprising a broadband receiver in a settop box.

6. The system of claim 1 further comprising a broadband receiver in a device configured for operation with a display.

7. The system of claim 1 wherein the divider shifter divides by the first number to divide the frequency of the local oscillator signal by the first number and the divider shifter divides by the second number to divide the frequency of the local oscillator frequency by the second number.

8. A method for tuning at least one incoming signal, said method comprising:
   generating a local oscillator signal;
   receiving an incoming signal comprising a first incoming signal frequency band and a second incoming signal frequency band;
   dividing said local oscillator signal by a first number when said first incoming signal frequency band is selected and dividing said local oscillator signal by a second number when said second incoming signal frequency band is selected to generate at least one fractional signal, wherein the first number is essentially half the second number;
   mixing said at least one fractional signal and said incoming signal to tune said selected incoming signal frequency band, thereby reducing interference with said local oscillator signal.

9. The method of claim 8 further comprising dividing said local oscillator signal by a value N before comparison with a reference frequency, thereby controlling a frequency of said local oscillator signal.

10. The method of claim 8 wherein said incoming signal frequency band is determined by a frequency identifier.

11. The method of claim 8 wherein said incoming signal is tuned in a broadband receiver.

12. The method of claim 8 wherein said incoming signal is tuned in a broadband receiver in a settop box.

13. The method of claim 8 wherein said incoming signal is tuned in a broadband receiver in a device configured for operation with a display.

14. The method of claim 8 wherein the local oscillator signal is divided by the first number to divide the frequency of the local oscillator signal by the first number and the local oscillator signal is divided by the second number to divide the frequency of the local oscillator signal by the second number.

15. A system for tuning at least one incoming signal, said system comprising:
   local oscillator means for generating a local oscillator signal;
   divider-shifter means coupled to said local oscillator means and receiving said local oscillator signal to generate at least one fractional signal;
   downconverter means coupled to said divider-shifter means and receiving said at least one fractional signal;

an incoming signal comprising a first incoming signal frequency band and a second incoming signal frequency band coupled to said downconverter means;

wherein said divider-shifter means divides the local oscillator signal by a first number when said first incoming signal frequency band is selected and divides the local oscillator signal by a second number when said second incoming signal frequency band is selected, wherein the first number is essentially half the second number; and wherein said at least one fractional signal is used to tune said selected incoming signal frequency band, thereby reducing interference between said downconverter means and said local oscillator means.

16. The system of claim 15 further comprising N-divider means for dividing said local oscillator signal by a value N before comparison with a reference frequency, thereby controlling a frequency of said local oscillator signal.

17. The system of claim 15 further comprising a frequency identifier for determining the incoming signal frequency band.

18. The system of claim 15 further comprising a broadband receiver.

19. The system of claim 15 further comprising a broadband receiver in a settop box.

20. The system of claim 15 further comprising a broadband receiver in a device configured for operation with a display.

21. The system of claim 15 wherein the divider-shifter means divides by the first number to divide the frequency of the local oscillator signal by the first number and the divider-shifter means divides by the second number to divide the frequency of the local oscillator signal by the second number.

* * * * *

UNITED STATES PATENT AND TRADEMARK OFFICE
CERTIFICATE OF CORRECTION

PATENT NO. : 7,564,928 B2 Page 1 of 1
APPLICATION NO. : 11/174359
DATED : July 21, 2009
INVENTOR(S) : Arun Jayaraman It is certified that error appears in the above-identified patent and that said Letters Patent is hereby corrected as shown below:

On Page 1 of the patent, in the title (Item) 54, "STATELITE" should be
-- SATELLITE --.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,564,928 B2  
APPLICATION NO. : 11/174359  
DATED : July 21, 2009  
INVENTOR(S) : Arun Jayaraman Page 1 of 1

It is certified that error appears in the above-identified patent and that said Letters Patent is hereby corrected as shown below:

Title Page of the patent, in the title (Item) 54 and Column 1, line 4, "STATELITE" should be -- SATELLITE --.

This certificate supersedes the Certificate of Correction issued September 1, 2009.

Signed and Sealed this

Twenty-second Day of September, 2009

David J. Kappos  
*Director of the United States Patent and Trademark Office*